United States Patent [19]
Schmidt et al.

[11] Patent Number: 6,075,492
[45] Date of Patent: Jun. 13, 2000

[54] MICROWAVE ANTENNA ARRAY FOR A MOTOR VEHICLE RADAR SYSTEM

[75] Inventors: Ewald Schmidt, Ludwigsburg; Klaus Voigtlaender, Wangen; Jürgen Zeiher, Stuttgart; Bernhard Lucas, Mundelsheim; Thomas Beez, Weinsberg; Dirk Langenhan, Schwieberdingen; Herbert Olbrich, Rutesheim; Joerg Schneemann, Weissach, all of Germany

[73] Assignee: Robert Bosch GmbH, Stuttgart, Germany

[21] Appl. No.: 09/155,829

[22] PCT Filed: Feb. 6, 1998

[86] PCT No.: PCT/DE98/00343

§ 371 Date: Mar. 24, 1999

§ 102(e) Date: Mar. 24, 1999

[87] PCT Pub. No.: WO98/35403

PCT Pub. Date: Aug. 13, 1998

[30] Foreign Application Priority Data

Feb. 6, 1997 [DE] Germany ............... 197 04 399
Dec. 15, 1997 [DE] Germany ............... 197 55 607

[51] Int. Cl.[7] .................................................. H01Q 19/06
[52] U.S. Cl. ........................................... 343/753; 343/909
[58] Field of Search .................................. 343/753, 754, 343/909, 911 L, 911 R

[56] References Cited

U.S. PATENT DOCUMENTS

| | | | |
|---|---|---|---|
| 4,566,321 | 1/1986 | Zacchio | 343/753 |
| 4,755,820 | 7/1988 | Backhouse et al. | 343/700 MS |
| 5,185,613 | 2/1993 | Whatmore et al. | 343/753 |
| 5,264,859 | 11/1993 | Lee et al. | 343/753 |
| 5,455,589 | 10/1995 | Huguenin et al. | 343/753 |
| 5,883,601 | 3/1999 | Tanaka et al. | 343/753 |

FOREIGN PATENT DOCUMENTS

| | | |
|---|---|---|
| 217 426 | 4/1987 | European Pat. Off. . |
| 498 524 | 8/1992 | European Pat. Off. . |
| 44 12 770 | 10/1995 | Germany . |
| 1 95 11 982 | 10/1996 | Germany . |
| 1 95 30 065 | 1/1997 | Germany . |
| 2 252 452 | 8/1992 | United Kingdom . |

OTHER PUBLICATIONS

"Fundamentals Superstate (Cover) Effects on Printed Circuit Antennas," N.G. Alexopoulos et al., IEEE Transactions on Antennas and Propagation, vol. AP–32, No. 8, Aug. 1984, pp. 807–16.

*Primary Examiner*—Tan Ho
*Attorney, Agent, or Firm*—Kenyon & Kenyon

[57] ABSTRACT

A microwave antenna arrangement, made up of a focusing element and at least one feeder element, in which arrangement, to attain a small size, at least one component support is arranged in a spatial area between the focusing element and the at least one feeder element, electronic or electrical components being located on the component support. The component support has a cut-out to allow passage of the electronic waves. The component support and the electronic or electrical components are provided for processing signals other than those received or emitted by the at least one feeder element.

9 Claims, 2 Drawing Sheets

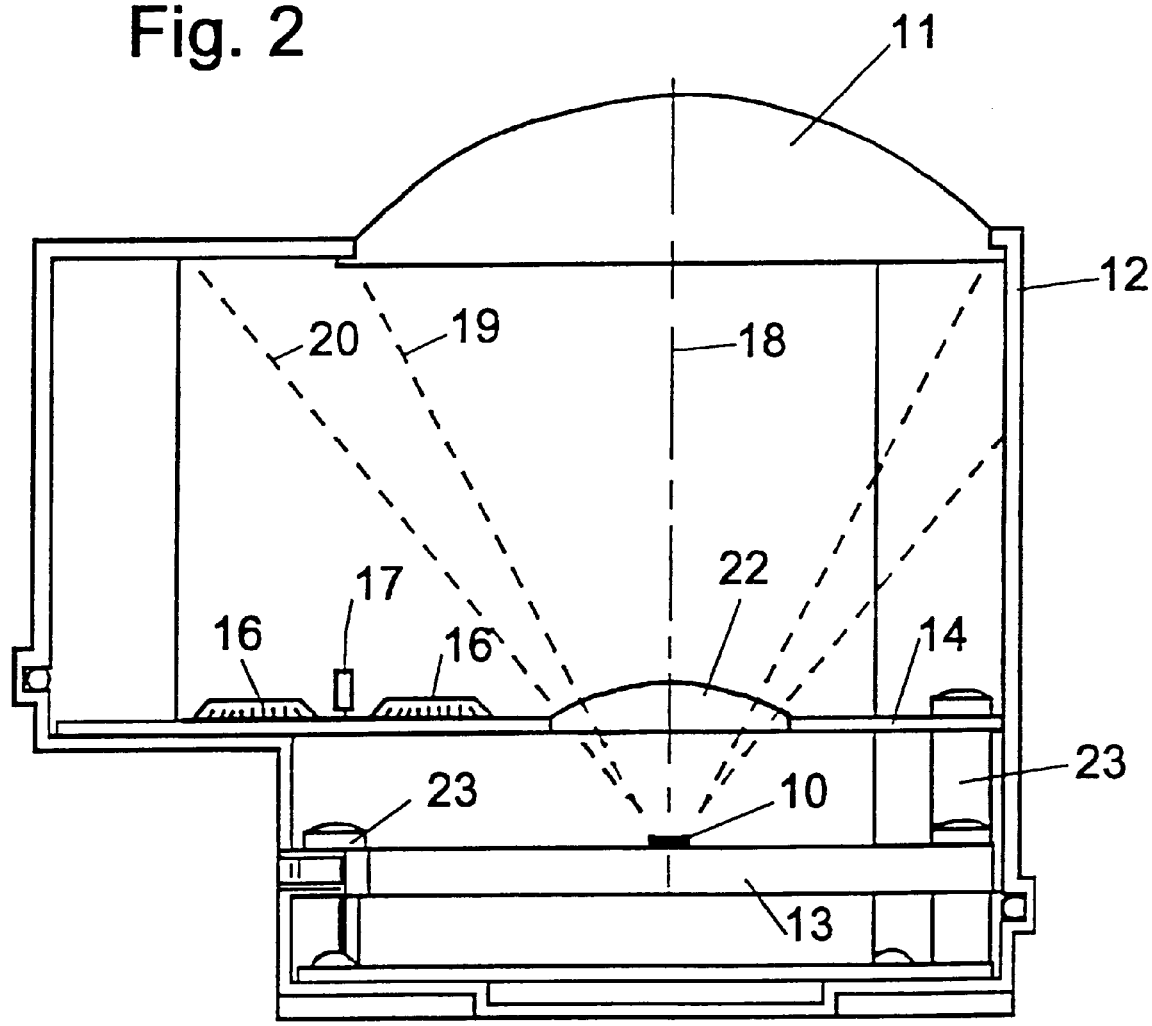

MICROWAVE ANTENNA ARRAY FOR A MOTOR VEHICLE RADAR SYSTEM

FIELD OF THE INVENTION

The present invention relates to a microwave antenna arrangement for a motor-vehicle radar system.

BACKGROUND INFORMATION

A conventional motor vehicle may be equipped with a radar system which is used, e.g., for detecting obstacles or vehicles traveling up ahead. Such a radar system must be adapted to the special installation ambiency of a motor vehicle. In this context, besides an appropriate resistance with respect to temperature fluctuations, soiling or acceleration, the size of the radar system also plays a role.

European Patent No. 498 524 describes a motor-vehicle radar system having two separate microwave antenna arrangements for the transmitting path and for the receiving path. Both microwave antenna arrangements include one or a plurality of active feeder elements, and one dielectric lens each for focusing the radar beams. The entire arrangement is accommodated in a two-part housing which, in each case, is terminated (i.e., each housing part is terminated) in the beam direction of the radar system by the two dielectric lenses.

In German Patent No. 44 12 770, a motor-vehicle proximity radar warning system is specified which needs only one microwave-lens antenna arrangement both for the transmitting path and for the receiving path. In this case as well, the radar system is accommodated in a housing which is terminated in the beam direction by the dielectric lens of the microwave antenna arrangement. To achieve a small overall depth, a lens with a short focal distance is used, the lens in addition being designed as a stepped lens in order to reduce the lens thickness.

U.S. Pat. No. 5,455,589 describes a compact microwave and millimeter-wave radar that is likewise provided for use in motor vehicles. To attain a small size, in this radar an antenna arrangement is used in which the ray path of the electromagnetic waves is optically "folded". To that end, an antenna arrangement, composed of a focusing lens and a feeder element, is provided with two reflective layers. A first layer, described as a transreflector, is arranged in front of or behind the antenna lens. It allows electromagnetic waves of a specific polarization direction through, while it reflects electromagnetic waves of the polarization direction at right angles thereto. A second layer, described as a twist reflector, is arranged about the feeder element. It reflects incident electromagnetic waves, during which it turns the waves in their polarization direction by 90°. Due to this arrangement, radar beams are reflected repeatedly between the two layers mentioned, both during transmission and during reception. For this reason, the distance between the feeder elements and the antenna lens can be shortened to an amount which is less than the focal distance of the antenna lens alone.

However, even if U.S. Pat. No. 5,455,589 and German Patent No. 44 12 770 apply themselves in particular to the problem of proposing a compact motor-vehicle radar system, none of the design approaches indicated avoids the disadvantage that the area between the feeder elements and the antenna lens remains empty, and thus largely unused. The size of this area is determined by the necessary focal distance of the antenna lens utilized. In all the design approaches described, this space takes up a large part of the overall space needed by the radar system.

The German Patent No. 195 11 982 describes an arrangement for an imaging radar having a transmitter and a receiver. One exemplary embodiment shows that waves from a waveguide are imaged via a collimator lens through an antenna array onto a second lens. Thus, the antenna array receives the waves to be transmitted and the waves to be received, and is arranged between the waveguide and the second lens. However, the objective of this arrangement is not to achieve a small size, but rather an arrangement in which it is possible to dispense with a local receiving oscillator. It is quite essential in this arrangement that the antenna array and, optionally, components mounted on it as well, are provided for processing the signals to be transmitted and/or to be received. The size of the radar is not reduced by this means.

SUMMARY OF THE INVENTION

An object of the present invention is to specify a microwave antenna arrangement, by which the size of a transmitting and/or receiving system, which includes the antenna arrangement, is able to be reduced, additionally or alternatively to conventional designs. This objective is achieved by component supports, which have no function within the framework of the antenna arrangement itself, nevertheless arranged in a spatial area between the feeder element and the focusing means.

The advantage of the microwave antenna arrangement according to the next invention is that the available space within a housing in which the transmitting and/or receiving system is installed can be optimally utilized. Accordingly, due to the displaced spatial arrangement, according to the present invention, of other needed modules such as signal-processing or power-supply circuits, the housing can be reduced to the actually needed size. It is particularly advantageous if the component support arranged according to the present invention, and the components mounted on it, are provided for processing signals which lie in a frequency range that is lower than the frequency range of the electromagnetic waves. This assures good decoupling.

Optionally, the components on the component support that is arranged according to the present invention can be shielded by screening plates. Along the same lines, it is advantageous if the components are provided for processing digital signals, or are a constituent of a power-supply circuit.

If, according to one advantageous exemplary embodiment of the present invention, a sub-lens is used as a further focusing means, the focal distance of the antenna arrangement, and thus the size of the transmitting and/or receiving system, can be even further reduced. Moreover, such pre-focusing has the advantage that the microwaves are focused more exactly on the actual (main) antenna lens. In this manner, spill-over loss of this antenna lens is diminished. Advantageously, the sub-lens is secured to the component support, which means assembly is substantially easier and less tolerance-sensitive that in known arrangements for reducing or preventing spill-over such as, for instance, in the case of "dielectric rod antennas" or polyrods. Alternatively, a dielectric member can also be used as pre-focusing means, whose dimensions are so selected that it functions as a superstrate for the waves used. How these dimensions must be selected is described, e.g., in "Fundamental Superstrate (Cover) Effects on Printed Circuit Antennas," by Alexopoulos et al IEEE Transactions on Antennas and Propagation, vol. AP-32, no. 8, pages 807–816.

BRIEF DESCRIPTION OF THE DRAWINGS

FIG. 1b shows a top view of the radar system of the present invention according to FIG. 1a.

FIG. 2 shows the cross-section of another exemplary embodiment of a motor-vehicle radar system having an antenna arrangement according to the present invention.

DETAILED DESCRIPTION

Figure 1A:
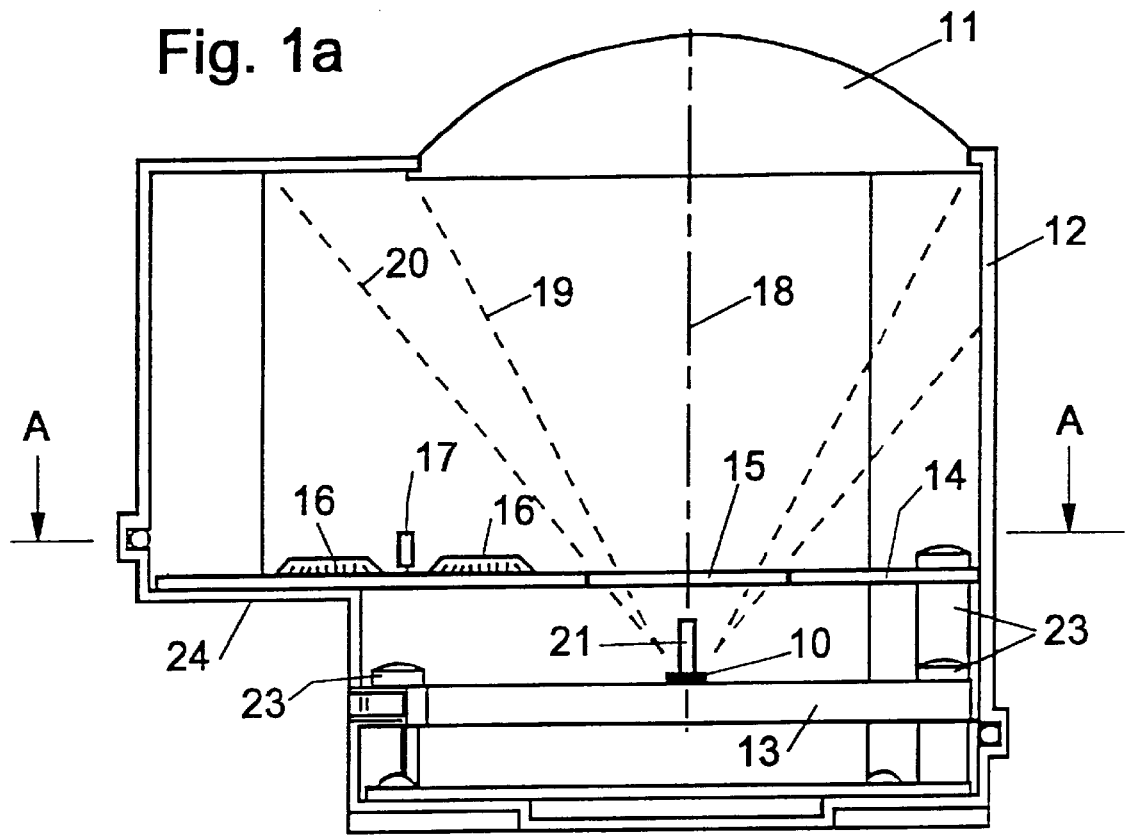
FIG. 1a shows a cross-section of a motor-vehicle radar system having a microwave antenna arrangement according to an exemplary embodiment of the present invention.

FIG. 1a shows in cross-section a motor-vehicle radar system of the present invention having an appropriate microwave antenna arrangement. The antenna arrangement, made up of at least one feeder element 10 and one antenna lens 11, is accommodated in a housing 12. At the same time, antenna lens 11 is a component of housing 12, i.e., it forms, as it were, a window for the transmitted or received microwave beam. The at least one feeder element 10 is located on a first component support 13 that includes, for example, a microstrip circuit arrangement. In this context, the at least one feeder element 10 is preferably a sufficiently known patch element. Alternatively, instead of this first component support 13 and one or a plurality of patch elements 10, for example, a waveguide arrangement can also be located here. Arranged between the at least one feeder element 10 and antenna lens 11 is a further component support 14. This component support has a cut-out 15, through which the microwave beam transmitted or received by feeder element 10 can pass. Two dotted V-shaped lines 19 and 20 denote, e.g., ray paths of the microwaves. Furthermore, individual components 16 and 17 are sketched on component support 14. These components are provided for processing signals other than those received or emitted by the at least one feeder element 10. Preferably, component support 14 contains signal-processing and signal-analysis circuits which analyze the received signals in the intermediate-frequency range or base band. Power-supply or voltage-supply circuits for the radar system could be indicated as a further example.

In this exemplary embodiment, component supports 13 and 14 are mounted posts 23 or on a housing projection 24. However, this does not exclude other mounting possibilities. Moreover, e.g., a dielectric rod antenna (polyrod) 21 is sketched above feeder element 10 as well. A line 18 denotes the main beam direction of the antenna arrangement.

Figure 1B:
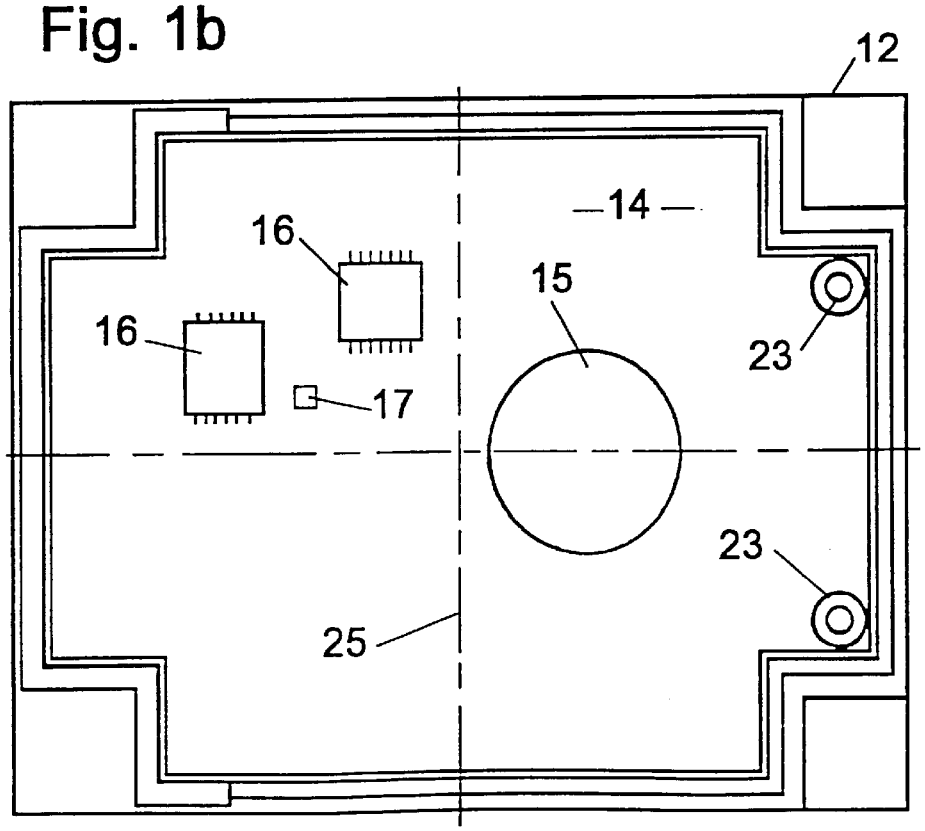

FIG. 1b shows the top view of the previously described motor-vehicle radar system according to the section line A—A. To be seen is component support 14 lying further above within housing 12. Component support 14 features cut-out 15, already indicated, which is preferably circular and through which the transmitted or received electromagnetic waves are able to pass. Also sketched are components 16 and 17, presumed by way of example, and posts 23, upon which component support 14 is mounted. A line 25 indicates a symmetrical or center line of component support 14.

The motor-vehicle radar system thus described, having the microwave antenna arrangement of the present invention, operates according to conventional radar methods, e.g., as FMCW radar (i.e., a frequency modulated continuous wave radar) or even as pulsed radar. Furthermore, such a microwave antenna arrangement can naturally also be used for all other microwave applications such as radio relay.

A familiar problem in antenna arrangements according to the species, having at least one feeder element and one focusing means, is that, because the feeder elements' own directivity is usually low, a portion of the emitted microwave beam goes past the focusing means. This, in turn, results in two disadvantageous effects. First of all, this portion is then naturally not focused by the focusing means or antenna lens 11 in the desired direction, which adversely affects the overall performance of the antenna arrangement. Secondly, this portion spilling over antenna lens 11 is reflected by the inside walls of housing 12. As a result, unwanted microwave radiation propagates within housing 12, which can possibly have a disruptive effect on components 16 or 17. To suppress these reflections, it is known, for example, from the German Patent No. 44 12 770 to provide the inside walls of housing 12 with an absorbent material. In this manner, at least the disturbing effect of the microwaves spilling over antenna lens 11 can be reduced. However, over and above that, in order to improve the overall performance of the antenna arrangement as well, it is know to provide feeder elements 10 with "dielectric rod antennas" (polyrods) 21, i.e., to arrange such dielectric rod antennas in front of feeder elements 10. A ray path of microwaves transmitted without using polyrods 21 is sketched in FIG. 1a with V-shaped line 20; a ray path with the use of polyrods 21 is sketched with V-shaped line 19. However, problematic in this case is an exact mounting of polyrods 21, especially when "patch antennas" are used as feeder elements 10. A slight inclined position of polyrods 21, which are only a few millimeters large, already leads again to a spill-over loss of antenna lens 11. Such polyrods 21 must also be positioned only a few micrometers above such patch elements, which is likewise problematical, particularly in the case of large-scale production.

FIG. 2 shows the cross-section of a motor-vehicle radar system, having a microwave antenna arrangement of the present invention, according to an advantageous exemplary embodiment of the present invention which is dedicated in particular to the difficulties just described. The basic design corresponds to the radar system sketched in FIG. 1a, so that the same reference numerals also designate the same elements. The advantageous exemplary embodiment according to the present invention is that cut-out 15 in component support 14 is filled in with a further antenna lens (sub-lens) 22. Alternatively, sub-lens 22 could also be mounted above or below cut-out 15 or, instead of the lens-shaped dielectric member, a superstrate can be useful. Various lens shapes or dielectric materials can be used. Spill-over loss of antenna lens 11, as well as the described disadvantages associated with it, are avoided due to the focusing effect of sub-lens 22. In addition, the focal distance of the entire antenna arrangement is reduced by the use of a multiple lens system, thus allowing the size of the radar system to be reduced even further for this reason as well. At the same time, the mounting of sub-lens 22 is substantially less sensitive with respect to tolerances, compared to the mounting of polyrods 21. However, if it appears advisable to one skilled in the art, polyrods 21 can still be used in addition.

In expansion or continuation of what has been described above, naturally a plurality of component supports 14 can also be arranged in the area between feeder element(s) 10 and focusing means 11.

Furthermore, also falling under the present invention are exemplary embodiments in which the "cut-out" of component support 14 is "so large" that component support 14, shown here in one piece, is made of two separate parts which are each arranged in the spatial area between the focusing means and the feeder element, and between which the electromagnetic waves are able to pass.

What is claimed is:

1. A microwave antenna arrangement for a motor-vehicle radar system, comprising:

at least one focusing arrangement focusing electromagnetic waves;

at least one feeder element for at least one of (a) receiving and (b) emitting the electromagnetic waves;

a component support including a cut-out portion allowing a passage of the electromagnetic waves, the component support being situated in a spatial area between the at least one focusing arrangement and the at least one feeder element, the component support being situated substantially transverse to a main beam direction of the microwave antenna arrangement, the component support being spaced from the at least one feeder element and the at least one focusing arrangement; and electrical components, the component support supporting the electrical components, the electrical components processing signals other than the electromagnetic waves.

2. The microwave antenna arrangement according to claim 1, wherein the at least one focusing arrangement includes a dielectric lens.

3. The microwave antenna arrangement according to claim 1, wherein the signals processed by the electrical components are within a frequency range which is lower than a frequency range of the electromagnetic waves.

4. The microwave antenna arrangement according to claim 1, wherein the electrical components process digital signals.

5. The microwave antenna arrangement according to claim 1, wherein the electrical components include one of a power-supply circuit and a voltage-supply circuit.

6. The microwave antenna arrangement according to claim 1, further comprising:

at least one further focusing arrangement arranged between the at least one feeder element and the at least one focusing arrangement, the least one further focusing arrangement being secured to the component support.

7. The microwave antenna arrangement according to claim 6, wherein the at least one further focusing arrangement includes a dielectric lens, the dielectric lens being arranged one of in the cut-out portion, above the cut-out portion and below the cut-out portion.

8. The microwave antenna arrangement according to claim 6, wherein the at least one further focusing arrangement includes a dielectric member, dimensions of the dielectric member being predetermined to act as a superstrate for the electromagnetic waves.

9. The microwave antenna arrangement according to claim 1, wherein a motorvehicle radar system includes the microwave antenna arrangement.

* * * * *